(12) United States Patent
Taylor et al.

(10) Patent No.: US 12,369,661 B2
(45) Date of Patent: Jul. 29, 2025

(54) METHOD FOR MAKING A GARMENT MATERIAL

(71) Applicant: ATG Ceylon (Pvt) Limited, Katunayake (LK)

(72) Inventors: John Taylor, Telford (GB); Mohamed Fazal Abdeen, B Colombo (LK); Sunil Mendis, Gampaha (LK); Andrew Goth, San Diego, CA (US)

(73) Assignee: ATG CEYLON (PVT) LIMITED, Katunayake (LK)

( * ) Notice: Subject to any disclaimer, the term of this patent is extended or adjusted under 35 U.S.C. 154(b) by 993 days.

(21) Appl. No.: 17/047,223

(22) PCT Filed: May 29, 2019

(86) PCT No.: PCT/GB2019/051458
§ 371 (c)(1),
(2) Date: Oct. 13, 2020

(87) PCT Pub. No.: WO2019/229427
PCT Pub. Date: Dec. 5, 2019

(65) Prior Publication Data
US 2021/0169164 A1 Jun. 10, 2021

(30) Foreign Application Priority Data
May 31, 2018 (GB) .................................. 1808887

(51) Int. Cl.
*A41D 31/24* (2019.01)
*A41D 19/00* (2006.01)
(Continued)

(52) U.S. Cl.
CPC ....... *A41D 31/245* (2019.02); *A41D 19/0065* (2013.01); *B29C 41/14* (2013.01);
(Continued)

(58) Field of Classification Search
CPC ..... B29L 2031/4864; B05D 7/02; B05D 1/18; A41D 2500/54; A41D 19/0065;
(Continued)

(56) References Cited

U.S. PATENT DOCUMENTS 4,283,244 A 8/1981 Hashmi
4,350,732 A 9/1982 Goodwin
(Continued)

FOREIGN PATENT DOCUMENTS

EP 0816060 A2 1/1998
EP 0823506 A2 2/1998
(Continued)

OTHER PUBLICATIONS

International Search Report and Written Opinion issued in International Application No. PCT/GB2019/051458 dated Sep. 9, 2019; 10 pages.
(Continued)

*Primary Examiner* — Alissa J Tompkins
*Assistant Examiner* — Catherine M Ferreira
(74) *Attorney, Agent, or Firm* — Wegman Hessler Valore (57) ABSTRACT

A method of making a garment material and garment material and garments obtainable by the method.
The method comprises providing a first layer, which is a shaped polymer and applying a liner to the first layer, the liner being formed of yarn and having interstices through it. A fluid polymeric material is then applied to the liner so that it permeates the interstices and is allowed to solidify to thereby form a second layer in which the liner is embedded in the solid polymeric material. Fibres are then applied to form a textile layer, which serves as a skin-contacting layer. The garment material comprises a first layer (70, 76, 78), which is a shaped polymer; a second layer (80), which is a shaped polymer that is provided at one or more locations on
(Continued)

the first layer, the second layer taking the shape of the first layer at said one or more locations; and a textile layer (82). The second layer is located between the first layer and the textile layer and a liner (22) is embedded in the second layer, the liner being formed of yarn and having interstices through it.

19 Claims, 3 Drawing Sheets

(51) Int. Cl.
    *B05D 1/18*     (2006.01)
    *B05D 7/02*     (2006.01)
    *B29C 41/14*     (2006.01)
    *B29C 41/20*     (2006.01)
    *B29C 41/22*     (2006.01)
    *B29L 31/48*     (2006.01)
    *B29L 31/50*     (2006.01)

(52) U.S. Cl.
    CPC .............. *B29C 41/20* (2013.01); *B29C 41/22* (2013.01); *A41D 2500/54* (2013.01); *B05D 1/18* (2013.01); *B05D 7/02* (2013.01); *B29L 2031/4864* (2013.01); *B29L 2031/501* (2013.01)

(58) Field of Classification Search
    CPC ...... A41D 31/245; B29C 41/22; B29C 41/20; B29C 41/14
    USPC ........................................................... 2/168
    See application file for complete search history.

(56) References Cited

U.S. PATENT DOCUMENTS

| | | |
|---|---|---|
| 2004/0078867 A1 | 4/2004 | Herbert et al. |
| 2008/0134412 A1 | 6/2008 | Lapp et al. |
| 2008/0299341 A1 | 12/2008 | Renaud et al. |
| 2016/0021951 A1 | 1/2016 | Karls |

FOREIGN PATENT DOCUMENTS

| | | |
|---|---|---|
| EP | 2243802 A2 | 10/2010 |
| GB | 2306392 A | 5/1997 |
| GB | 2539474 A | 12/2016 |
| JP | 859123566 A | 7/1984 |
| JP | 61113804 A | 5/1986 |
| JP | 2008208512 A | 9/2008 |
| JP | 2011-157656 A | 8/2011 |
| JP | 2012016827 A | 1/2012 |
| TW | 221472 B | 3/1994 |
| WO | 2005068186 A1 | 7/2005 |
| WO | 2005088005 A1 | 9/2005 |
| WO | 2006039131 A1 | 4/2006 |
| WO | 2006065854 A2 | 6/2006 |
| WO | 2006075980 A1 | 7/2006 |
| WO | 2010022024 A1 | 2/2010 |
| WO | 2011051727 A1 | 5/2011 |
| WO | 2015061828 A1 | 5/2015 |

OTHER PUBLICATIONS

Search Report issued in application GB1808887.2 dated Feb. 15, 2019; 2 pages.
Search Report issued in application GB1709729.6 dated Nov. 8, 2017; 1 page.
International Preliminary Report on Patentability issued in International Application No. PCT/GB2019/051458 dated Mar. 20, 2020; 16 pages.
Japanese Office Action of Corresponding Japanese Patent Application No. 2020-562109 dated Jul. 14, 2023, 3 pages.
Office Action of Corresponding Korean Patent Application No. 10-2020-7035091 dated Dec. 30, 2023, 21 pages.
Examination Report for Australian Patent Application No. 2019279395 dated Feb. 26, 2024, 2 pages.

METHOD FOR MAKING A GARMENT MATERIAL

The present invention relates to a method for making polymeric garment material, the polymeric garment material and garments made of such material.

Polymeric materials are currently used for a wide range of garments and some of these garments (for example, raincoats and aprons) make use of the protective properties of the material. When handling hazardous or damaging substances, it is necessary to wear protective gloves. For example, in certain sectors of industry it is necessary for workers to wear heavy duty protective gloves to prevent their hands from being exposed to hazardous chemicals, in the form of oils etc. Polymeric materials can be used together with a knitted liner to make such gloves. The gloves are known as supported gloves since the polymeric material is supported on the liner. The liner is next to the wearer's skin in use.

Unsupported gloves (gloves with no knitted lining) are produced for general purpose and chemical use which are thinner than supported gloves but which have very poor cut and tear resistance and have a low service life compared to supported gloves.

A known method of producing a knitted nylon garment that has a polyurethane (PU) coating (e.g. a supported glove) comprises:
i. fitting a knitted nylon lining to a former;
ii. immersing the former (fitted with the lining) into a solution of PU and dimethylformamide (DMF);
iii. withdrawing the former from the solution of PU and DMF and allowing excess solution to drain leaving a coating of the PU/DMF solution on the lining;
iv. immersing the former in water for 90 to 120 minutes to cause the PU coating on the lining to coagulate, i.e. the PU coating sets, and to allow the DMF solvent to leach out of the lining into the water;
v. withdrawing the former from the water and placing it in an oven to dry the PU coated nylon liner; and
vi. removing the PU coated nylon liner from the former to obtain a PU coated garment.

A major disadvantage with this method is that it uses DMF. DMF is a solvent that is known to be very toxic, and one that is easily absorbed through the skin. Therefore great care has to be taken when handling the solution of PU/DMF. The atmosphere in which the method is carried out needs to be well ventilated and provided with extraction fans in order to provide a safe working environment.

It is desirable for a protective glove to be liquid impermeable and resistant to corrosion by chemicals, so as to protect a wearer's hands. However, a conventional supported glove is problematic in that hairs from the lining protrude through the rubber coating allowing harmful chemicals to wick to inside of the glove causing harm to the wearer.

In the case of gloves having a cotton lining, the lining can be singed to remove the textile hairs but this is time consuming and not reliable. Moreover, this is not practical for synthetic yarns, such as nylon, since it melts the yarn. Consequently conventional supported gloves for chemical protection have thick coatings of rubber to cover the hairs. The use of a thick coating isn't always sufficient so the gloves have to be pressure tested, which is time consuming and expensive, since a percentage of gloves fail the pressure test. The gloves are also cumbersome and lack flexibility and dexterity.

WO2010022024 describes a damage tolerant flexible cut resistant chemical handling latex glove. The glove comprises a polymeric shell; a knitted cut resistant liner defining interstices between knits of the liner; and a polymer bonding layer that bonds to the liner integrally and replicates the rough texture of the liner, thereby providing a glove external surface with excellent grip properties.

WO2011/051727 provides a method for making a garment that has improved properties in terms of being liquid impermeable and resistant to corrosion by chemicals, so as to protect a wearer's hands. A polymeric material having fibres suspended therein is applied to a liner.

It is also desirable for a protective glove to be cut and tear resistant so as to protect a wearer's hands. A supported glove may be made where the lining is prepared from special cut resistant yarns when cut-resistance is required. However, such cut-resistant yarns are expensive compared to nylon and cotton yarns. Moreover, in some cases, they may still suffer from difficulties in terms of chemical corrosion.

It is desirable for a protective glove to be cut and tear resistant, liquid impermeable and resistant to chemical corrosion so as to protect a wearer's hands. However, it is also desirable for such a protective glove to be lightweight and flexible, so as not to hinder the wearer's dexterity, and have an outer surface that provides good traction between the glove and an object being handled. It would also be desirable to provide a glove which is comfortable, so that a wearer is not inclined to remove the protective gloves in hazardous environments, e.g. by providing improved sweat absorption or dissipation properties.

Gloves with a subset of the above desirable properties are known, but generally known gloves do not exhibit all of these properties, or do not exhibit them to as great a degree as is desirable.

According to a first aspect of the present invention there is provided a method of making a garment material, comprising:
providing a first layer, which is a shaped polymer;
applying to the first layer a liner formed of yarn and having interstices through it;
applying to the liner a fluid polymeric material that permeates the interstices;
allowing the fluid polymeric material to solidify to thereby form a second layer in which the liner is embedded in the solid polymeric material; and
applying fibres to form a textile layer.

The method of the invention provides a garment material where a liner is embedded in a polymer i.e. the liner is completely coated or enveloped by the solid polymeric material. This is achieved by applying ("dressing") the liner onto the first layer, coating the liner with the fluid polymeric material, and then applying a textile layer. The inventors have determined that "sandwiching" the liner within the garment material provides improved properties.

Without being bound by theory the inventors propose that the fluid polymeric material blocks the interstices in the knitted yarn and thereby "locks" the liner in place. Hence, the fluid polymeric material can be considered to be a "bonding" compound.

This reinforces the garment material to provide strength and cut-resistance. This reinforcement may be provided while maintaining flexibility.

It will be understood that the invention also resides in garment material and garments producible by the method of the first aspect.

In a conventional supported glove the liner is first fitted to a former (mould) and the subsequent coating only partially penetrates the liner; the liner is coated on just one side with polymeric material and therefore is not "embedded" as defined in the context of the present invention.

In the conventional supported glove it is desirable to minimise the amount of penetration into the interstices since the liner is worn next to the skin. Therefore, if the polymeric material soaked through the liner this would mean direct contact between the polymer and this skin. This can cause irritation and build-up of perspiration next to the skin and, in particular, some wearers may be allergic to PU.

It will be understood that the method of the present invention is different from that described in WO2010/022024. In WO2010/022024 a knitted liner is integrally bonded to a latex shell to provide a rough external texture with excellent grip properties. The liner is not "sandwiched" within the material, as in the present invention. In addition, if an electrostatic flock coating is applied to the glove of WO2010/022024, it is applied to the skin-contacting surface of the garment (not the external surface which provides grip).

Liner

The liner is applied to the first layer, which is a shaped polymer. The first layer is solid (rather than fluid) when the liner is applied to allow easy "dressing" of the liner. In embodiments the first layer is obtained by fully drying a polymeric material.

The liner may be formed by knitting, weaving or some other known process but, typically, the liner is a knitted liner. The liner has interstices through it and may be considered to be a lattice. It will be understood that the liner will take the shape of the first layer.

The liner may be similar to those employed in conventional supported gloves. However, an advantage of the method is that a thinner liner may be employed if desired, thereby reducing costs. This is especially beneficial when specialised yarns are employed (such as cut-resistant yarns) since such yarns are expensive.

The liner is formed from yarn and may be produced from a wide range of yarn materials, for example, one of, or a blend of two or more of: cotton, nylon, elastane (also known as Spandex™ or Lycra™), polyester (including Cool-Max™), aramid (including Technora® and para-aramids such as Kevlar® and Twaron®), polyethylene (including ultra-high-molecular-weight polyethylene available under the brand names Dyneema® and Spectra®), fibre glass, acrylic, carbon (conductive) fibre, copper (conductive) fibre, Thunderon™ conductive fibre (copper sulfide chemically bonded to acrylic and nylon fibers), high strength liquid crystal polyesters (including the multifilament yarn spun from liquid crystal polymer available under the brand name Vectran™) and polyolefin fibres (including Viafil®).

The method is particularly useful when the yarn comprises cut-resistant fibres. In the context of the present invention a "cut liner" in a liner formed of yarn comprising cut-resistant fibres. When a cut liner is employed the resulting garment material has greater cut-resistance than would be expected for a given thickness of cut liner, for example, as compared to a supported glove employing the same thickness of cut liner.

Suitable cut-resistant fibres include one of, or a blend of two or more of aramid (including para-aramid), ultra-high-molecular-weight polyethylene (UHMWPE), high strength polypropylene, high strength polyvinyl alcohol, high strength liquid crystal polyesters, and fibre glass. In embodiments the liner comprises ultra-high-molecular-weight polyethylene and/or fibre glass.

Typically, the liner comprises cut-resistant fibres together with conventional fibres.

In embodiments the yarn comprises at least one of (i) aramid, ultra-high-molecular-weight polyethylene, fibre glass, carbon fibre, copper fibre, and high strength liquid crystal polyesters and/or at least one of (i) cotton, nylon, elastane, polyester, and acrylic. In embodiments the yarn comprises at least 30 wt % (i) and/or no more than 70 wt % (ii); at least 50 wt % (i) and/or no more than 50 wt % (ii); or at least 60 wt % (i) and/or no more than 40 wt % (ii).

In embodiments the yarn comprises (i) ultra-high-molecular-weight polyethylene and fibre; and/or (ii) nylon.

The yarn may be described with reference to its Denier (D). Denier is the mass in grams per 9000 meters of the yarn. Hence, a lower Denier corresponds to a finer liner.

In embodiments the liner is formed from yarn having a denier of no more than 1000 D, no more than 800 D, no more than 600 D, no more than 400 D, no more than 200 D, no more than 100 D or no more than 50 D and/or at least 10 D, at least 30 D, at least 50 D, or at least 100 D. In one embodiment the liner is formed from yarn having a Denier from 50 to 100 D.

The liner can be described with reference to its weight/area once applied to the first layer. In embodiments the liner has a weight/area of at least 5, 7, 9, 11 or 13 mg/cm$^2$ and/or no more than 50, 40, 30, 20, 15, 12 or 10 mg/cm$^2$. In embodiments the liner has a weight/area of from 9 to 12 mg/cm$^2$.

It will be understood that the liner will usually be stretched over the first layer (that may be mounted on a former). As such, the un-stretched liner e.g., the liner as knitted, will have a greater weight/area than the stretched liner. Stretching the liner provides a more open construction i.e. the interstices in the substrate are enlarged.

In embodiments the liner takes the form of a complete garment, e.g. a glove, a boot, a shoe or a sock. This means that the garment can be obtained directly, rather than having to join pieces of garment material together. Such a garment will be seamless.

In embodiments the liner is in a form that is a section of a garment, for example a pocket for a coat or a finger for a glove.

Alternatively the liner may be in the form of a sheet. In this case, a garment or garment section is produced by further processing of the sheets of garment material, for example by pieces being cut from the sheet of garment material and then the pieces being used to make a garment.

The First Layer

It will be understood that the first layer may be formed from a single layer of polymeric material. Alternatively the first layer is built up of a number of sub-layers or coatings of polymeric material. In one such embodiment the first layer is built up from at least two sub-layers, e.g. three sub-layers. The use of multiple sub-layers is useful for a number of reasons.

Multiple sub-layers are useful as a means to vary the thickness of the resulting garment material. For a glove, it can be useful to have a thicker material from the fingers to the wrist (more sub-layers), and thinner material for the cuff (fewer sub-layers).

Multiple sub-layers are useful since they allow a number of different polymeric materials to be employed. For example, it may be desirable for the outermost coating to have different properties (chemical resistance, colour etc.) from an inner coating.

The shaped polymer may have the shape of a complete garment, e.g. a glove, sock, shoe or boot, or the shaped polymer may have the shape of a garment section. If sheets of garment material are required then the shaped polymer may be a polymer sheet.

It will be understood that the first layer and the resulting garment material are typically flexible. It is desirable for a garment material to be flexible so that the resulting garment is comfortable and allows the wearer to move freely.

A wide range of polymeric materials are suitable for production of the first layer. Suitable materials include nitrile latex, natural latex, polyvinylchloride (PVC), polyvinylacetate (PVA), neoprene (polychloroprene), PU latex, butyl rubber (a copolymer of isobutylene with isoprene, also known as IIR), polyisobutylene (also known as "PIB" or polyisobutene rubber), polyvinyl alcohol, and fluoropolymer elastomer (including those sold under the VITON® brand.

In embodiments the first layer comprises nitrile latex, natural latex, neoprene, and/or butyl rubber.

In embodiments the first layer comprises nitrile latex and/or natural latex.

In embodiments the first layer comprises PVC.

The first layer may be made from the same polymeric material(s), or different polymeric material(s) from, the second layer.

In embodiments the first layer (which may comprise multiple sub-layers) has a thickness of no more than 1.0 mm, no more than 0.8 mm and/or at least 0.5 mm. The first layer is typically flexible and supported on a former, as discussed below.

The Second Layer

A fluid polymeric material is applied to the liner to permeate the interstices in the liner and the fluid polymeric material is then allowed to solidify to thereby form a second layer in which the liner is embedded in the solid polymeric material. It will be understood that the resulting solid polymeric material is typically flexible, rather than rigid.

The fluid polymeric material covers some or all of the first layer and will inevitably follow the shape of the first layer. Hence, the first and second layers are aligned. In one embodiment the fluid polymeric material covers all of the first layer.

It will be understood that sufficient fluid polymeric material must be applied to completely cover and coat the liner. If absorbent, the liner may be "soaked" with the fluid polymeric material. Hence, the second layer will have a minimum thickness that corresponds to the thickness of the liner. Moreover, excess fluid polymeric material may be applied such that the thickness of the second layer is greater than the thickness of the liner.

In embodiments the second layer has a thickness which is at least 100%, at least 120%, at least 150% or at least 200% of the thickness of the liner and/or the second layer has a thickness which is no more than 300%, no more than 200%, no more than 150%, no more than 130% of the thickness of the liner. While it is possible to apply a thick coating in which the liner is embedded, this increases the overall thickness of the garment material and therefore reduces the flexibility. Hence, in embodiments the second layer has a thickness which is at least 100% and no more than 300% of the thickness of the liner. This thickness provides a good balance of strength and flexibility.

In embodiments the second layer (which comprises the liner) has a thickness of no more than 1.0 mm, no more than 0.8 mm or no more than 0.5 mm and/or at least 0.3 mm or at least 0.5 mm.

A wide range of polymeric materials are suitable for production of the second layer. Suitable materials include nitrile latex, natural latex, polyvinylchloride (PVC), polyvinylacetate (PVA), neoprene (polychloroprene), PU latex, butyl rubber (a copolymer of isobutylene with isoprene, also known as IIR), polyisobutylene (also known as "PM" or polyisobutene rubber), polyvinyl alcohol, and fluoropolymer elastomer (including those sold under the VITON® brand.

In embodiments the second layer comprises nitrile latex, natural latex, neoprene, and/or butyl rubber.

In embodiments the second layer comprises nitrile latex or natural latex.

In embodiments the second layer comprises PVC.

The fluid polymeric material may be applied by dipping. i.e. the first layer having the liner applied thereto is dipped into (or immersed in) a container (e.g. a bath or trough) containing the fluid polymeric material e.g. a solution or suspension of the polymeric material, optionally with other components.

In embodiments the method comprises applying the fluid polymeric material directly to the liner (i.e. without first applying a coagulant to the liner). A coagulant is often used in a conventional method to help the fluid polymeric material coagulate on a substrate. However, the use of a coagulant on the liner would hinder the fluid polymeric material (effectively a bonding coating) soaking into the liner.

In the context of the present invention a coagulant is an aqueous or alcoholic solution of electrolytes. Suitable electrolytes include formic acid, acetic acid, calcium chloride, calcium nitrate, zinc chloride or a mixture of two or more of these. Methanol is typically used to provide the alcoholic solution but other alcohols are also suitable, for example, iso-propyl alcohol and ethanol may also be used. In embodiments the coagulant has a concentration (strength) of electrolytes of from 5% to 15% by weight.

Solidifying the fluid polymeric material may comprise coagulating the fluid polymeric material. In embodiments a coagulant may be applied to the fluid polymeric material to solidify it to form the second layer. Typically the coagulant is applied and then dried (e.g. by the application of heat with optional rotation).

The fluid polymeric material may be allowed to solidify by the application of heat. In one such embodiment solidifying comprises curing the fluid polymeric material.

The fluid polymeric material may be a plastisol. A plastisol is a suspension of plastics particles (e.g. PVC particles) in a liquid plasticizer. When heated (e.g. to around 177° C.), the particles and plasticizer mutually dissolve each other. On cooling (e.g. to below 60° C.), a flexible, permanently plasticized solid product results.

The application of heat may be done in an oven which may be fitted with one or more fans that distribute the heat evenly throughout the oven. The heating could also be achieved by directing hot air over the second layer.

The viscosity of the fluid polymeric material may be adjusted to ensure that it permeates the interstices of the liner. For example, the viscosity may be reduced as compared to a conventional supported glove.

Viscosity can be measured using a Brookfield Viscometer Model RVDV-E, Spindle #1 and should be quoted with the speed of rotation, e.g. Speed 2 RPM, and the temperature of measurement e.g. 30 to 32° C.

In embodiments the fluid polymeric material has a viscosity of no more than 10 Pa s (=10 Ns/m$^2$=100 poise), no more than 5 Pa s, or no more than 2 Pa s, when measured using a Brookfield Viscometer Model RVDV-E, Spindle #1, speed 2 RPM, 30-32° C.

In embodiments the fluid polymeric material has a viscosity of from 1 to 2 Pa s, when measured using a Brookfield Viscometer Model RVDV-E, Spindle #1, speed 2 RPM, 30-32° C.

Third and Subsequent Layers

The second layer has the liner embedded therein. In embodiments the method additionally comprises applying to the second layer a polymeric material and allowing the fluid polymeric material to solidify to thereby form a third layer.

This step may be repeated to build up a desired number of layers. For example, the method may additionally comprise applying to the third layer a fluid polymeric material and allowing the fluid polymeric material to solidify to thereby form a fourth layer. In general, the method may comprise applying to the nth layer a fluid polymeric material and allowing the fluid polymeric material to solidify to thereby form an (n+1)th layer where n is equal to or greater than 2.

The fluid polymeric material may be the same as, or different from the polymeric material employed in the first and/or second layer. The third (and subsequent) layers may be built up in the usual way by dipping/immersion in a bath containing a solution or suspension of the polymeric material.

In one such embodiment the method comprises applying a fluid polymeric material having fibres suspended therein and allowing the fluid polymeric material to solidify and thereby form a third (or subsequent layer) having fibres therein. In one embodiment the fluid polymeric material comprises at least 5%, at least 10%, at least 15% or at least 20% by dry weight of fibres (e.g. cotton flock). Hence, this method can be employed to form the textile layer (discussed below).

The use of fibres is particularly useful in the final layer since it can be used to provide the feel of a textile lining. Such a layer is comfortable next to the skin and can be considered to be a skin comfort layer.

Suitable fibres include cotton, rayon, aramid, polyamide, polyester, carbon, glass, polyacrylonitrile, polypropylene or a suitable combination of these. In one embodiment the fibres comprise or consist of cotton flock.

The fibres (e.g. cotton flock) may have a bulk density of no more than 200 g/l, 150 g/l or no more than 120 g/l and/or at least 50 g/l.

The fibres (e.g. cotton flock) may have a fibre length of no more than 1.0 mm or no more than 0.7 mm and/or at least 0.5 mm. In embodiments the fibres have a fibre length of from 0.5 to 1.0 mm.

The third or subsequent layer may comprise foamed polymeric material, for example, as described in WO2005/088005. In embodiments the method comprises applying to the nth layer a fluid polymeric material which is foamed, and allowing the fluid foamed polymeric material to solidify to thereby form an (n+1)th layer where n is equal to or greater than 2. An outer layer of the foamed polymeric material may be removed whereby the surface of the polymeric material has an open porous structure.

The third (and subsequent layers) may be built up using a coagulant. A coagulant is an aqueous or alcoholic solution of electrolytes that may be applied before a fluid polymeric material. Suitable electrolytes include formic acid, acetic acid, calcium chloride, calcium nitrate, zinc chloride or a mixture of two or more of these. Methanol is typically used to provide the alcoholic solution but other alcohols are also suitable, for example, iso-propyl alcohol and ethanol may also be used. In embodiments the coagulant has a concentration (strength) of electrolytes of from 5% to 15% by weight.

In one embodiment the method additionally comprises applying a coagulant to the second (or subsequent) layer, e.g. by immersion in the coagulant.

The third (and subsequent layers) may be built up using a plastisol.

Textile Layer

The textile layer is a skin contacting layer which makes the material more comfortable. The textile layer may be formed by applying fibres to the second layer. Alternatively, where a third (or subsequent) layer is present, the textile layer may be formed by applying fibres to the third or the subsequent layer.

Suitable fibres include cotton, rayon, aramid, polyamide, polyester, carbon, glass, polyacrylonitrile, polypropylene or a suitable combination of these.

The fibres may be applied by flocking. Flocking is the process of depositing many small fibre particles (called flock) onto a surface. Electostatic flocking employs a high-voltage electric field. The "flock" is given a negative charge whilst the substrate is earthed. Flocking can also be achieved by air blowing.

The fibres may be applied as a woven or non-woven material, e.g. fabric.

Former

In embodiments the method comprises providing a first layer, which is a shaped polymer that is fitted on (e.g. mounted on) a former.

The skilled person will understand that the first layer may be prepared by solidifying a fluid polymeric material in a given shape, e.g. by the use of a former. In embodiments the former is made from, metal, ceramic (e.g. porcelain), fibre glass or plastic.

In embodiments the method of the invention comprises an additional step of applying a fluid polymeric material to a former and allowing the fluid polymeric material to solidify to form the shaped polymer. A coagulant (defined above) may be applied to the former before the fluid polymeric material. The coagulant helps the fluid polymeric material to coagulate on the former.

The shaped polymer can be removed from the former before the liner is applied. However, it is preferred for the shaped polymer to remain on the former while the liner is applied. In this way the former can support the shaped polymer, even if it is very thin. The shaped polymer having the liner applied thereto may remain on the former while the fluidic polymeric material is applied and solidified.

In embodiments the method comprises an additional step of removing the garment material (or garment or garment section) from the former. After the garment material has been made it must be stripped (removed) from the former and it will be understood that the garment material may be inverted when it is removed from the former, such that the first layer becomes the outer surface.

The former may have the shape of a complete garment, e.g. a glove (hand-shaped), a sock or a boot (foot-shaped), or the former may have the shape of a garment section. If sheets of garment material are required then a former having a flat surface may be employed.

In embodiments the former has the shape of a complete garment (e.g. a glove) and the method comprises an additional step of removing the garment from former by turning it inside out.

The surface of the former is reflected in the surface of the first layer. Hence, if the former has a smooth outer surface, then the fluid polymeric material in contact with that smooth surface will solidify to form a first layer having a smooth surface. Similarly, if the former has a textured or "rough"

surface, the first layer will have a textured surface. It can be beneficial to have a range of textures in a garment. e.g. a grit-like surface is useful to provide grip.

The method of the present invention allows the surface of the first layer to tailored to a desired use. In a conventional supported glove a liner is applied to a former so the former does not impart any properties on the resulting garment.

In embodiments the former has an outer surface wherein some or all of the outer surface is textured (e.g. bumpy or rough). In embodiments the former has the shape of a glove wherein the glove has a palm and fingers and the outer surface is textured (e.g. grit-like) at the palm and/or at one or more of the fingers.

The invention also resides in a garment material, a garment or a garment section obtainable by the method of the first aspect.

The garment material of the present invention is suitable for producing a range of garments including a coat, an apron, a boot, a shoe, a sock, an item of underwear, and a glove.

In embodiments the garment material, garment or garment section has thickness of no more than 3.0, 2.0 or 1.5 mm and or at least 0.5 mm or at least 1.0 mm.

In embodiments the garment material, garment or garment section is flexible.

According to a second aspect of the present invention there is provided a garment material comprising
  a first layer, which is a shaped polymer;
  a second layer, which is a shaped polymer that is provided at one or more locations on the first layer, the second layer taking the shape of the first layer at said one or more locations; and
  a textile layer;
  wherein the second layer is located between the first layer and the textile layer and a liner is embedded in the second layer, the liner being formed of yarn and having interstices through it.

It will be understood that this garment material may be obtained by the method of the first aspect. The comments above in relation to the method apply equally here.

The second layer is supported on the first layer. The second layer covers some or all of the first layer and, where it covers the first layer, it has a corresponding shape to the first layer.

The textile layer may be provided at one or more locations on the second layer, the textile layer taking the shape of the second layer at said one or more locations.

The garment material may comprise a third or subsequent layer, which is a shaped polymer provided at one or more locations on the second layer, the third or subsequent layer taking the shape of the second layer at said one or more locations.

The textile layer may be provided on the third or subsequent layer.

The textile layer may be a shaped polymer having fibres therein.

The textile layer may be a flock lining.

The textile layer may be a woven or non-woven material, e.g. fabric.

According to a third aspect of the present invention there is provided a garment that is
  a glove, a boot, a shoe, or a sock, the garment comprising
  a first layer, which is a shaped polymer; and
  a second layer, which is a shaped polymer that is provided at one or more locations on the first layer, the second layer taking the shape of the first layer at said one or more locations; and
  a textile layer;
  wherein the second layer is located between the first layer and the textile layer and a liner is embedded in the second layer, the liner being formed of yarn and having interstices through it.

It will be understood that the garment may be obtained by the method of the first aspect, or made from the garment material of the second aspect. The first layer is shaped to provide a glove, a boot, a shoe, or a sock. The comments above in relation to the first and second aspects apply equally here.

The first layer corresponds to the outermost layer of the garment in use. In embodiments the first layer has an outer surface wherein some or all of the outer surface is textured (e.g. bumpy or rough).

In embodiments the first layer is shaped to provide a glove.

In one embodiment the garment is a glove wherein the glove has a palm and fingers and the outer surface is textured (e.g. grit-like) at the palm and/or at one or more of the fingers.

In embodiments the garment is seamless i.e. it is unitary rather than being made from two or more pieces of garment material that are joined together (e.g. by stitching). A seamless garment may be achieved by making the garment on a former having a shape corresponding to the garment.

In embodiments the garment comprises a third layer, which is a shaped polymer that is provided at one or more locations on the second layer, the third layer taking the shape of the second layer at said one or more locations.

In embodiments the garment comprises a (n+1)th layer, which is a shaped polymer that is provided at one or more locations on the nth layer, the (n+1) layer taking the shape of the nth layer at said one or more locations, where n is equal to or greater than 2, e.g. 2, 3 or 4.

In embodiments the garment comprises an inner layer, which is a shaped polymer having fibres (e.g. cotton flock) therein.

Preferred embodiments of the present invention will now be described, by way of example only, with reference to the accompanying drawings in which.

Figure 1:
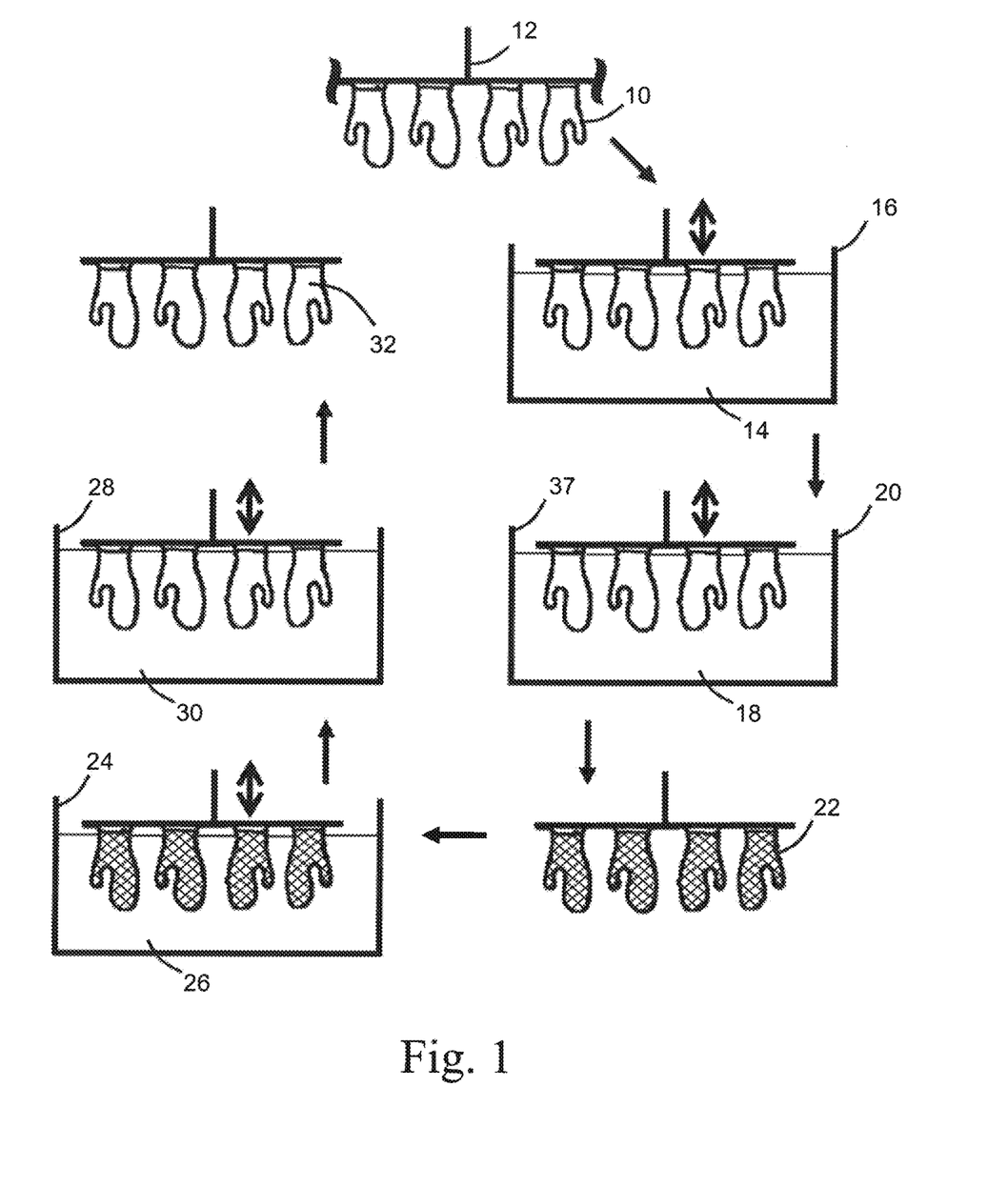
FIG. 1 schematically illustrates a method for making garment material according to an embodiment of the invention.

FIG. 1 schematically illustrates a method for making a garment according to an embodiment of the invention. At the first step four pairs of formers 10 are mounted in a row on a bar 12 termed a "flight bar". In this example each of the formers 10 has the shape of a complete garment—a glove—and may be made from, for example, metal, porcelain, fibre glass or plastic. The glove is drawn schematically (as a mitten) but would have the shape of a hand in practice. The flight bar 12 moves in a linear direction, from one process station to another at a set speed. Of course, the speed at which the flight bar 12 is set can be varied and there may be several flight bars, each being at a different stage of the process.

At the second step a first coagulant 14 is applied to the former 10. This is achieved by immersing the former 10 into a bath or trough 16 containing the first coagulant 14, but it may be achieved by spraying the first coagulant 14 onto the former 10. The first coagulant 14 is an aqueous or alcoholic solution of electrolytes. Calcium nitrate is used as the electrolyte in this example. The former 10 is then withdrawn from the bath/trough 16 and may be rotated to drain off and evaporate excess first coagulant 14.

At the third step a first polymeric material 18 is applied to the former 10, by immersion into a bath or trough 20 containing the first polymeric material 18. The first polymeric material comprises natural latex in this example. The former 10 is then withdrawn and may be rotated to drain off and evaporate excess first polymeric material 18.

At the fourth step a knitted liner 22 is dressed onto the former 10 that is already coated with the first coagulant 14 and the first polymeric material 18. In this example the liner 22 can be considered to be a cut liner since it is made from cut-resistant fibres (ultra-high-molecular-weight polyethylene and fibre glass yarn) together with nylon yarn. In a conventional process a liner is dressed directly onto a former, rather than to a polymeric coating.

At the fifth step the former 10, which supports the liner 22, is immersed in a bath/trough 24 containing a second polymeric material 26 and then withdrawn to allow excess to drain. The liner 22 is coated such that interstices in the liner 22 are blocked. The second polymeric material comprises NR latex.

At the sixth step the former 10, which supports the liner 22 that is coated with the second polymeric material 26 is immersed in a bath/trough 28 containing a second coagulant 30. The former 10, now supports the liner 22 that is sandwiched between the first and second polymeric materials 18, 26.

The polymeric materials are then dried and cured (not shown) to provide a glove 32 that is stripped from the former 10. Cotton flock may be applied electrostatically before or after the glove is stripped from the former.

Example 1—NR Glove

Figure 2:
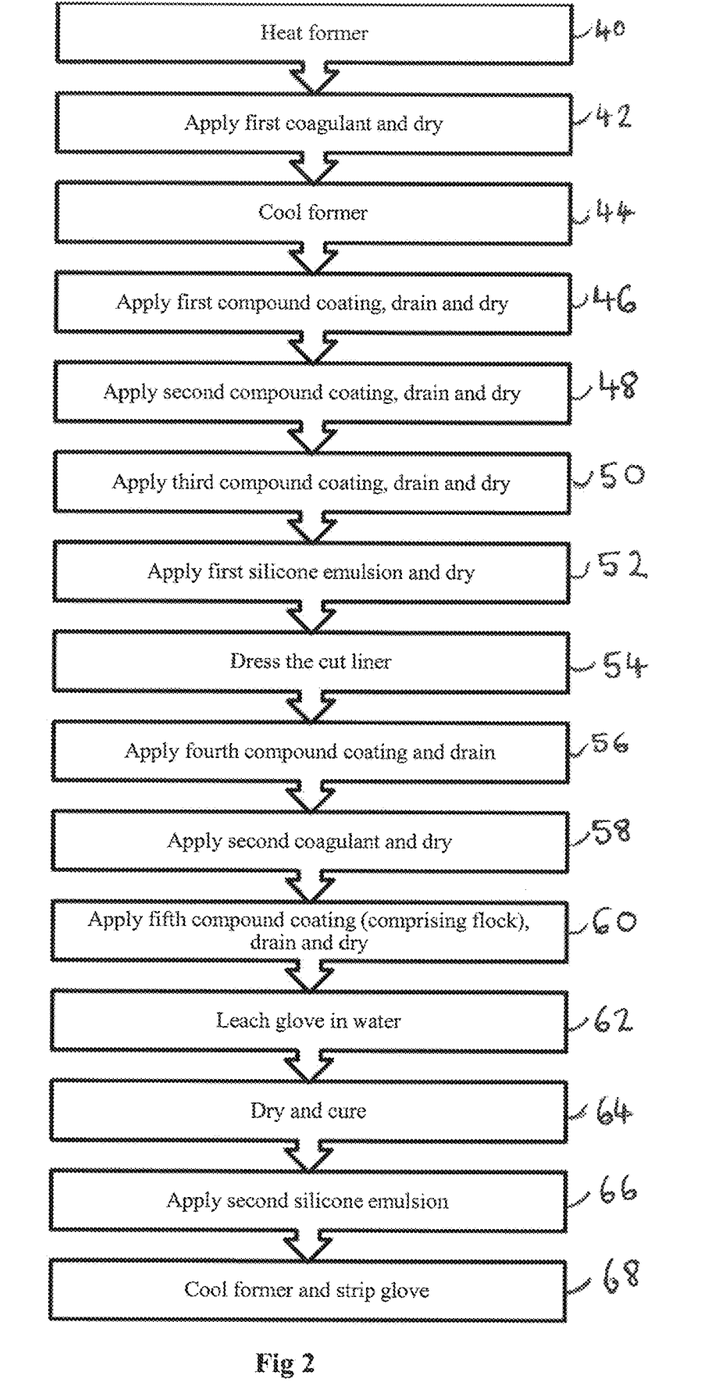
FIG. 2 is a flowchart illustrating a method of making garment material according to an embodiment of the invention.

FIG. 2 is a flowchart illustrating a specific method of making a natural rubber (NR) glove according to an embodiment of the invention. At a first step 40 a former having the shape of a hand (similar to the former 10 of FIG. 1) is heated for 20 minutes at a temperature of 50 to 60° C.

At step 42 the heated former is dipped into a first coagulant comprising water, calcium nitrate, talc powder, calcium carbonate, polyethylene glycol (PEG) and a surfactant. The former is removed and the coagulant it allowed to dry for 5 minutes (50 to 70° C. with air circulation and exhaust).

At step 44 the former is cooled with a fan for 3 minutes.

At step 46 the former is dipped up to the wrist (e.g. to a depth of 200 mm) in a first compound coating. The first compound coating is conventional; it comprises NR latex and has a viscosity of 1.0-1.5 Pa s @ 0.5 rpm Sp #01 (Brookfield Viscometer Model RVDV-E, 30-32° C.). The coated former is then drained and dried.

At step 48 the coated former is coated beyond the wrist (e.g. to a depth of 375 mm) with a second compound coating (NR latex; viscosity of 1.0-1.5 Pa s @ 0.5 rpm Sp #01, Brookfield Viscometer Model RVDV-E, 30-32° C.), drained and dried.

At step 50 the coated former is coated beyond the wrist (e.g. to a depth of 375 mm) with a third compound coating (NR latex; viscosity of 1.0-1.5 Pa s @ 0.5 rpm Sp #01, Brookfield Viscometer Model RVDV-E, 30-32° C.), drained and dried.

At step 52 a silicone emulsion is sprayed onto the hot former and then dried.

At step 54 a cut liner (e.g. the cut liner 22 shown in FIG. 1) is applied to the former, which is already coated with the compound coatings. The cut liner is knitted from 41% 100 D Dyneema® (UHMWPE), 22% 50 D fibre glass yarn and 37% nylon 6 yarn. The cut liner is knitted to a size smaller than is required, e.g. for the glove being made, and smaller than the former so that it stretches when fitted to the former.

The lining is stretched over the former such that the palm area, the cuff area and the back of the palm area have slightly different constructions (course and wale). The weight is 96 mg/inch$^2$ (=14.88 mg/cm$^2$) for the liner as knitted (i.e. unstretched liner), 75.3 mg/inch$^2$ (=11.7 mg/cm$^2$) for the palm area, 71.7 mg/inch$^2$ (=11.11 mg/cm$^2$) for the cuff area and 60.9 mg/inch$^2$ (=9.44 mg/cm$^2$) for the back of the palm area.

At step 56 the cut liner is coated with a fourth compound coating (NR latex), drained and dried. The fourth compound coating can be considered to be a bonding coating since it bonds the liner in place. The bonding coating has a viscosity of 1.0-1.5 Pa s @ 0.5 rpm SP #01 (Brookfield Viscometer Model RVDV-E, 30-32° C.).

At step 58 the coated former is dipped into a second coagulant comprising water, alcohol (isopropyl alcohol) and calcium nitrate. The coated former is then drained and dried.

At step 60 fibres are applied to form a textile layer. The coated former is dipped in a fifth compound coating comprising NR latex and cotton flock (~18% by dry weight; viscosity of 0.5-0.6 Pa s @ 2 rpm Sp #01, Brookfield Viscometer Model RVDV-E, 30-32° C.), drained and dried. The use of cotton flock provides the look and feel of a lining in the final glove.

At step 62 the glove is leached in water and allowed to drain.

At step 64 the glove is dried and then cured at elevated temperature (80 to 150° C.).

At step 66 a second silicone emulsion is applied to the hot former (120° C.).

At step 68 the glove (e.g. the glove 32 in FIG. 1) is cooled and then stripped from the former by turning it inside out. This means that the fifth compound coating comprising cotton flock becomes the innermost lining.

Various processes may be applied to the glove before it is sold/worn. For example, it may be cut to the relevant length and washed to remove any residues.

The complete glove (size 10) has a mass of 145 g±3 g.

Figure 3:
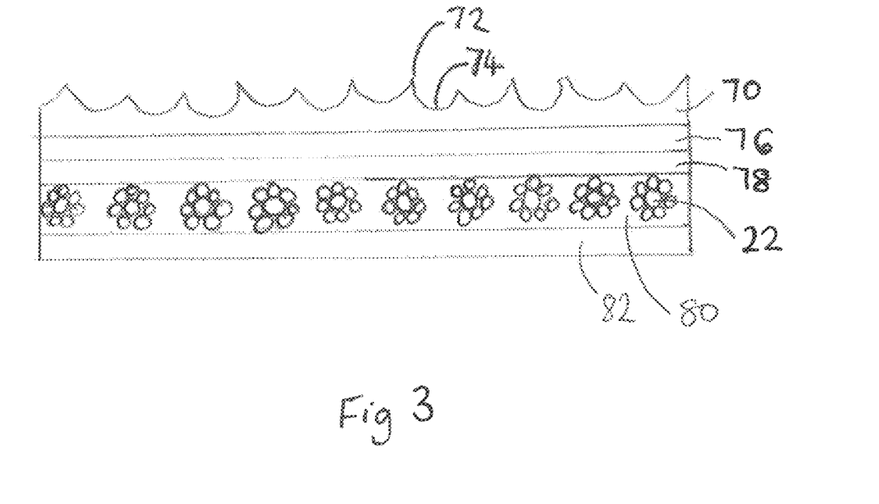
FIG. 3 is a cross-section of garment material in accordance with an embodiment of the invention that is produced by the method shown in FIG. 2.

Referring to FIG. 3 there is shown a cross-section of the NR glove produced by the method shown in FIG. 2. The first compound coating 70 is uppermost in this view and would be the outer-surface in use. This coating is uneven with peaks 72 and troughs 74, the peaks 72 having a greater thickness than the troughs. The maximum thickness is 0.32 mm. The first compound coating 70 may be known as an over dip and the variation in thickness provides better grip. Thicknesses are provided for the glove in the "relaxed" state i.e. without the application of pressure).

The second coating 76 is bonded to the first coating 70 on one side and to the third coating 78 on its opposite side. The second and third compound coatings 76, 78 have a combined thickness of 0.32 mm. The first, second and third coatings constitute a first layer that is built up from three sub-layers. The first layer therefore has a total thickness of 0.64 mm.

The cut liner 22 is embedded within the fourth compound coating 80, to provide a bonding layer (the second layer) with a thickness of 0.38 mm.

The fifth compound coating 82 (the textile layer) is lowermost in this view and would be the interior surface of the glove in use. The fifth compound coating 82 comprises cotton flock and has a thickness of 0.19 mm.

Example 2 NBR Glove

Figure 4:
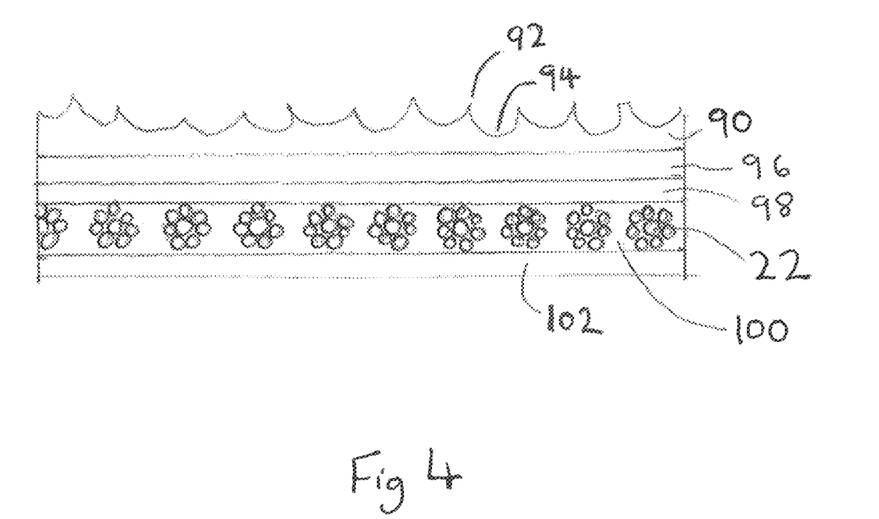
FIG. 4 is a cross-section of garment material in accordance with another embodiment of the invention.

Referring to FIG. 4 there is shown a cross-section of an NBR glove produced by a method analogous example 1 and FIG. 2. The NR latex employed in the first and second compound coating in example 1 was replaced with a blend of acrylonitrile copolymers and polyurethane An additional coagulant dipping took place after the second compound coating and the NR latex employed in the third, fourth and fifth compound coatings was replaced with polychloroprene.

Each of the first, second and third compound coatings had a viscosity 2.5-3.0 Pa s @20 rpm Sp #01). The bonding compound coating has a lower viscosity of 1.0-1.4 Pa s @ 20 rpm Sp #01 to ensure that it soaks into the liner. The fifth compound coating (containing cotton flock) has a viscosity of 4-5 Pa s @20 rpm Sp #01. Viscosity was measured using a Brookfield Viscometer Model RVDV-E at 30 to 32° C.

The complete glove (size 10) has a mass of 155 g±3 g.

An NBR coating 90 is uppermost in this view and would be the outer-surface in use. This coating is uneven with peaks 92 and troughs 94, the peaks 92 having a greater thickness than the troughs. The maximum thickness is 0.31 mm and the minimum thickness is 0.10 mm. Thicknesses are provided for the glove in the "relaxed" state i.e. without the application of pressure). The NBR coating 90 may be known as an over dip and the variation in thickness provide better grip.

The next coating 96 is another NBR coating that is bonded to the NBR over dip 90 on one side and to a polychloroprene compound coating 98 on the other side. The NBR coating 96 has a thickness of 0.12 mm (relaxed state) and the polychloroprene coating has a thickness of 0.16 mm. The first three coatings build up to form the first layer, which has a thickness of 0.59 mm.

The cut liner 22 is embedded within the polychloroprene coating layer 100, to provide a bonding layer (the second layer) having a thickness of 0.42 mm (relaxed state).

The lowermost coating 102 (the textile layer) will be the interior surface of the glove in use. The lowermost coating 102 comprises cotton flock and has a thickness of 0.17 mm.

Properties

The properties of gloves made according to embodiments of the invention were determined and compared to commercially available products (NR and NBR supported gloves):
Comparative example 1: Alto Plus 260 (Mapa)
Comparative example 2: Stansolv AK-22 (Mapa)
Comparative example 3: Sol-knit® 39-122 (Ansell).
Comparative example 4: Alphatec® 58-530W (Ansell)

The mechanical performance was determined according to EN 388:2003 unless otherwise stated. This is the European standard for protective gloves.

NR Gloves (Ex. 1 and Comp. Ex 1)

|  | Ex. 1 NR | Comp. Ex. 1 |
|---|---|---|
| Abrasion resistance | Level 3 (cycles > 2000) | Level 2 |
| Blade cut resistance | Level 3 | Level 1 |
| Tear resistance | Level 4 (=75-100N) | Level 2 |
| Puncture resistance | Level 1 (=40-45N) | Level 0 |
| ISO 13997 Cut resistance | Level B (=9.5N) |  |

NBR Gloves (Ex. 2 and Comp. Ex. 2, 3 and 4)

|  | Ex. 1 NR | Ex. 2 NBR | Comp. Ex. 2 | Comp. Ex. 3 | Comp. Ex. 4 |
|---|---|---|---|---|---|
| Abrasion resistance | Level 3 (cycles > 2000) | Level 4 (cycles > 10000 | Level 3 | Level 4 | Level 4 |
| Blade cut resistance | Level 3 | Level 3 | Level 1 | Level 1 | Level 1 |
| Tear resistance | Level 4 (=75-100N) | Level 4 (=75-85N) | Level 2 | Level 1 | Level 2 |
| Puncture resistance | Level 1 (=40-45N) | Level 1 (=50-65N) | Level 1 | Level 1 | Level 1 |
| ISO 13997 Cut resistance | Level B (=9.5N) | Level B (=5.4-6.4N) |  |  |  |

The tear resistance for examples 1 and 2 (level 4) is greater than for the comparative examples (level 2 or 1).

The blade cut resistance for examples 1 and 2 (level 3) is greater than for each of comparative examples (level 1).

The abrasion resistance and puncture resistance of the examples is similar to that of the comparative examples.

The mechanical performance was also determined according to ASTMF 1970-05 and ISO 13997 for examples 1 and 2.

|  | Example 1 NR glove | Example 2 NBR glove |
|---|---|---|
| ASTM Cut resistance | Level 02 (=900-975 g) | Level 02 (=550-650 g) |
| Blade Cut Resistance (ISO 13997) | level B (=9.5N) | Level B (=5.4-6.4N) |

Chemical performance was determined against a range of chemical products. The EN374 category is provided in brackets. The breakthrough time (minutes) is provided with the corresponding level (e.g. L6=level 6).

NR Gloves (Ex. 1 and Comp. Ex 1)

| Chemical product | Ex. 1 | Comp. Ex. 1 |
|---|---|---|
| Acetone 99% (ketone) | 16 L1 | 18 L1 |
| Acetic acid | 40 L2 |  |
| Hydrochloric acid 37% | 414 L5 |  |
| Methanol 99% (primary alcohol) | 109 L3 | 108 L3 |
| Nitric acid 70% | 197 L4 |  |
| Sodium hydroxide 40% (inorganic base) | >480 L6 | >480 L6 |
| Phosphoric acid 85% | >480 L6 |  |
| Potassium hydroxide | >480 L6 |  |
| Sulphuric acid 96% (inorganic mineral acid) | 232 L4 | 93 L3 |

NBR Gloves (Ex. 2 and Comp. Ex. 2, 3 and 4)

| Chemical product | Ex. 2 | Comp. Ex. 2 | Comp. Ex. 3 | Comp. Ex. 4 |
|---|---|---|---|---|
| 2-propanol (isopropanol) 99% | >480 L6 | >480 L6 | >480 L6 | >480 L6 |
| Acetone 99% (ketone) | 19 L1 | 3 L0 | <5 L0 | 6 L0 |
| Ethyl acitate (ester) | 7 L0 | 7 | <5 | 15 L1 |
| Ethanol 95% | 221 L4 | 288 L5 | 118 L3 | 208 L4 |
| Hydrochloric acid 37% | >480 L6 | >480 L6 |  | >480 L6 |
| Hexane | >480 L6 | >480 L6 | >480 L6 | >480 L6 |
| Hydrogen peroxide 30% | >480 L6 |  |  | >480 L6 |
| Methanol 99% (primary alcohol) | 70 L3 | 72 L3 | 4 L0 | 40 L2 |

-continued

| Chemical product | Ex. 2 | Comp. Ex. 2 | Comp. Ex. 3 | Comp. Ex. 4 |
|---|---|---|---|---|
| Methyl ethyl ketone (2-butanone) 99% | 5 L0 | 3 L0 | 1 L0 | 7 L0 |
| Nitric acid 70% | 180 L4 | | 8 L0 | 53 L2 |
| Sodium hydroxide 40% (inorganic base) | >480 L6 | >480 L6 | >480 L6 | >480 L6 |
| Phosphoric acid 85% | >480 L6 | >480 L6 | | |
| Sulphuric acid 40% | >480 L6 | >480 L6 | | |
| Sulphuric acid 50% | >480 L6 | >480 L6 | | |
| Sulphuric acid 96% (inorganic mineral acid) | 101 L3 | 97 L3 | 21 L1 | 114 L3 |

Example 2 (the NBR glove in accordance with an embodiment of the invention) provides excellent chemical performance (level 6) against 2-propanol, hydrochloric acid, hexane, hydrogen peroxide, sodium hydroxide, phosphoric acid, and sulphuric acid. This performance is as good as the commercially available products.

Moreover example 2 provides better protection than the commercial products with respect to acetone and nitric acid.

The invention claimed is:

1. A method of making a garment material, the method comprising:
   (a) providing a first layer, which is a shaped polymer; then
   (b) applying to the first layer a liner formed of yarn and having interstices through it; then
   (c) applying to the liner a fluid polymeric material that permeates the interstices; then
   (d) allowing the fluid polymeric material to solidify to thereby form a second layer in which the liner is embedded in the solid polymeric material; and then
   (e) applying fibres to form a textile layer, such that the second layer is located between the first layer and the textile layer.

2. The method of claim 1, wherein the first layer is in the shape of a glove, a boot, a shoe, or a sock.

3. The method of claim 1, wherein the first layer is built up from at least two sub-layers of polymeric material.

4. The method of claim 1, wherein applying fibres comprises applying a fluid polymeric material having fibres suspended therein and allowing the fluid polymeric material to solidify and thereby form the textile layer.

5. The method of claim 1, wherein applying fibres to form the textile layer comprises (i) flocking; (ii) applying a woven material; or (iii) applying a non-woven material.

6. The method of claim 1, wherein the shaped polymer is fitted on a former, and optionally the former is a ceramic former.

7. The method of claim 6, additionally comprising removing the garment material from the former, wherein the garment material is inverted when it is removed from the former such that the first layer becomes an outer layer.

8. A garment material obtainable by the method of claim 1, the garment material comprising:
   the first layer, which is a shaped polymer;
   the second layer, which is a shaped polymer that is provided at one or more locations on the first layer, the second layer taking the shape of the first layer at said one or more locations; and
   the textile layer;
   wherein the second layer is located between the first layer and the textile layer and a liner is embedded in the second layer, the liner being formed of yarn and having interstices through it.

9. The garment material of claim 8, wherein the textile layer is provided at one or more locations on the second layer, the textile layer taking the shape of the second layer at said one or more locations.

10. The garment material of claim 8, wherein the textile layer is a shaped polymer having fibres therein.

11. The garment material of claim 8, wherein the textile layer is (i) a flock lining; or (ii) a woven or non-woven material.

12. A garment comprising the garment material of claim 8, wherein the garment is a glove, a boot, a shoe, or a sock.

13. The garment of claim 11, which is seamless.

14. The garment material of claim 8, wherein the liner has a thickness and the second layer has a thickness that is at least 100% and no more than 300% of the thickness of the liner.

15. The garment material of claim 8, wherein the yarn comprises one of, or a blend of two or more of aramid, such as para-aramid; ultra-high-molecular-weight polyethylene; high strength polypropylene; high strength polyvinyl alcohol; high strength liquid crystal polyesters; and fibre glass.

16. The garment material of claim 8, wherein the yarn comprises at least one of (i) aramid, ultra-high-molecular-weight polyethylene, fibre glass, and high strength liquid crystal polyesters; and at least one of (ii) cotton, nylon, elastane, polyester, and acrylic.

17. The garment material of claim 8, wherein the first layer or the second layer comprises nitrile latex or natural latex.

18. The garment material of claim 8, wherein the garment material has a thickness of no more than 2.0 mm.

19. The method of claim 1, wherein the shaped polymer is fitted on a former and the former has the shape of a hand or a foot, such that a glove, sock, shoe or boot is obtained.

* * * * *